Feb. 4, 1941. E. W. FICKEN Re. 21,709

FURROW DAMMING IMPLEMENT

Original Filed July 29, 1936 2 Sheets-Sheet 1

Elmer W. Ficken.
INVENTOR

BY Victor J. Evans & Co.
ATTORNEYS

Feb. 4, 1941. E. W. FICKEN Re. 21,709

FURROW DAMMING IMPLEMENT

Original Filed July 29, 1936 2 Sheets-Sheet 2

Elmer W. Ficken. INVENTOR

BY Victor J. Evans & Co.

ATTORNEYS

Reissued Feb. 4, 1941 Re. 21,709

UNITED STATES PATENT OFFICE 21,709

FURROW DAMMING IMPLEMENT

Elmer W. Ficken, Bison, Kans., assignor to Deere & Company, Moline, Ill., a corporation of Illinois Original No. 2,112,767, dated March 29, 1938, Serial No. 93,265, July 29, 1936. Application for reissue June 30, 1938, Serial No. 216,763

41 Claims. (Cl. 97—55)

My invention relates to improvements in furrow damming, or blocking, implements for attachment to lister plows to block furrows during the plowing thereof.

As explanatory, in the preparation of crop land it is the practice to plow furrows or ditches by means of lister plows and to block the furrows at intervals to hold the water and soil therein and thereby obviate soil erosion.

The primary object of my invention, generally stated, is to provide a simply constructed, efficient implement for attachment to a lister plow and automatically operative to pick up earth behind the plow and to deposit same at substantially regular intervals in the furrow or ditch being plowed or replowed, as the case may be.

Still another object is to provide a device of the class and for the purpose set forth, adapted to automatically accumulate and dump substantially uniform loads of earth in the furrow and which is controlled, primarily, as regards dumping, by the accumulation of the load therein.

A more specific object is to provide an implement of the class set forth comprising a revolving scoop and an escapement mechanism for timing the revolution thereof, automatically released when the scoop has accumulated a load.

Other objects are to provide an implement for the purposes above set forth which may be readily attached to the beam of lister plows of the usual types, is light in weight, strong and durable, simple in construction and economical to manufacture.

To the accomplishment of the above, and subordinate objects presently appearing, a preferred embodiment of my invention and one modification thereof have been illustrated in the accompanying drawings, set forth in detail in the following description, and defined in the claims appended hereto.

Figure 1:
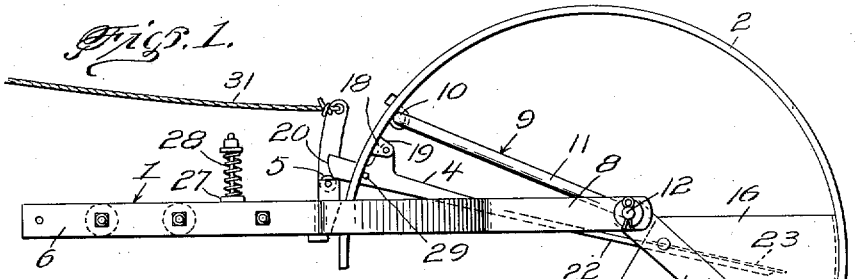
Figure 1 is a view in side elevation of the preferred embodiment of my invention, the parts being shown in normal position.
Figure 2:
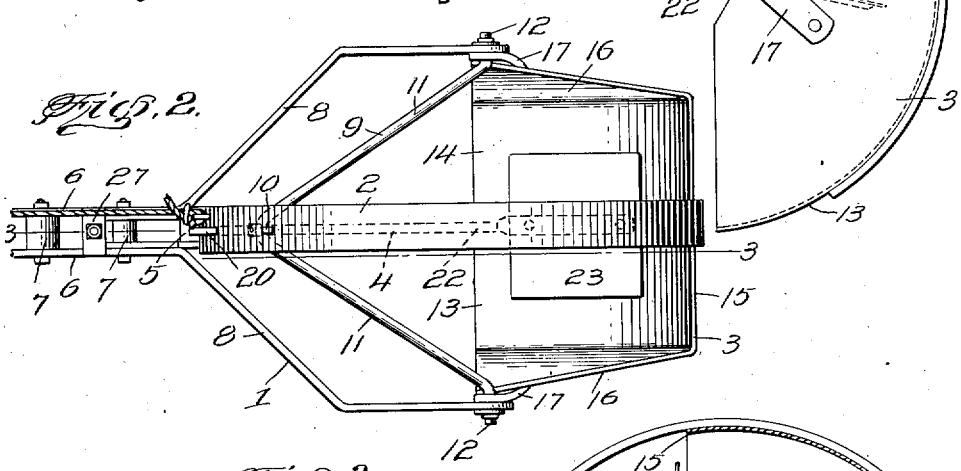
Figure 2 is a view in top plan.
Figure 3:
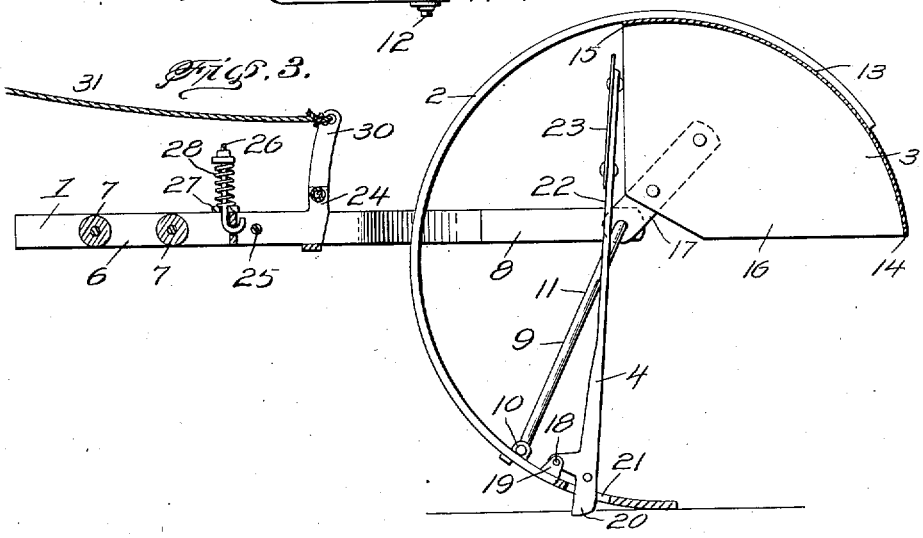
Figure 3 is a view in longitudinal vertical section taken on the line 3—3 of Figure 1 with the parts shown in dumping position.

Reference being had to the drawings by numerals, my improved implement, as illustrated in Figures 1 to 3, comprises a yoke-like frame 1, a segmental ground engaging shoe 2 thereon, and an earth accumulating tool in the form of a transversely disposed blade or segmental scoop 3 mounted in the shoe 2.

The frame 1 comprises opposed front arms 6 spaced apart laterally in parallel relation, by rollers 7, and rear diverging yoke arms 8. The front arms 6 are designed to be attached to the beam 6′ of a lister plow, so that the frame 1 is vertically movable thereon, as shown for instance in Figure 4, by means of a universal joint 7′ secured to said beam for vertical adjustment thereon by means of clips, as at 8′. Connection of the frame 1 to the lister plow by means of the universal joint 7′ provides for vertical and lateral swinging movement of the frame relative to the lister plow.

The shoe 2 comprises a narrow segmental band of suitable metal curved in the arc of a circle and rotatably mounted in said yoke arms 8 for rotation, eccentrically, about a horizontal axis transverse to said frame 1. The means for mounting the shoe 2 includes a V-shaped spider member 9 bolted at its apex, as at 10, to the inner face of the shoe 2 and forming a pair of divergent spokes 11 terminating in right-angled spindles 12 journaled in said yoke arms 8.

The scoop 3 is formed in the arc of a smaller segment than the shoe 2, and comprises a bottom wall 13 having straight front and rear edges 14 and 15, respectively, and side walls 16. The scoop 3 is secured in the shoe 2, in any suitable manner, with its bottom wall 13 centered thereon at one end of said shoe and with its front edge 13 extending through the gap between the ends of said shoe. A pair of side bars 17 secured to said side walls 16, respectively, and pivotally mounted on the spindles 12, complete the means for mounting the shoe 2 on said frame 1. Thus, the scoop and shoe comprise a rotatable scraper assembly which rotates relative to the draft members 8 about a transversely extending axis passing through the spindles 12.

In the normal position of the shoe 2 and scoop 3, the front edge of the scoop drags on the ground in the furrow and lightly scrapes the sides of the furrow to pick up a load of earth therefrom as the implement is drawn along the furrow by the plow. The rotatable assembly is held against rotation by an escapement mechanism to be described presently, which gauges the height of the pile of earth accumulated by the scoop, and when the height of the pile reaches a predetermined value, the escapement mechanism is actuated in a manner to be described, allowing the scraper assembly to rotate and deposit the accumulated earth in the furrow to form a dam. The dams are thus made all the same height, regardless of the condition of the soil or the speed of advance.

The before-mentioned escapement mechanism comprises an arm 4 pivoted, as at 18, on the inner face of the shoe 2, opposite the scoop 3, between lugs 19 on said shoe, to rock vertically in the plane of the latter. The arm 4 carries detent means in the form of a short front lever end 20 projecting through a slot 21 in the shoe 2 outside the latter. The rear long end 22 of the arm 4 is adapted to extend into the rear end of the scoop 3 and is provided with a plate or gauge 23 secured thereto. The arm 4 is balanced on its pivot 18 so that in the normal position of the parts it extends substantially diametrically of the shoe 2 with the plate 23 disposed in the rear end of the scoop 3 and its end 20 extending over and engaging the roller 5. The roller 5 is mounted on a bracket 24 pivoted, as at 25, on the frame bars 6 to be swung into and out of the path of movement of the end 20 of the lever 4. A hooked bolt 26 vertically movable in a bracket 27 on the bar 6 and tensioned by spring 28, is operatively connected to the bracket 24 to normally retain the roller 5 in the path of movement of the end 20 of the arm 4. In this position of the roller 5 the end 22 of the arm 4 is urged about the pivot 18 in a direction opposite to that of rotation of the shoe 2. A stop pin 29 on said arm 4 engaging the shoe 2, limits rotation of the arm 4 in this direction.

When the scoop 3 has picked up a maximum load, the earth therein accumulating against the plate 23 rocks the arm 4 on its pivot 18 so that the end 20 thereof wipes past the roller 5 and releases the shoe 2 and the scoop 3. The shoe 2 is then rotated, by the drag of the front edge 14 of said scoop on the ground, until the end of the shoe 2 opposite the scoop 3 engages the ground, at which point the scoop 3 is inverted. From this point on, the shoe 2 is rotated by peripheral engagement of the same with the ground until the parts are again in the normal position previously described. During rotation of the scoop 3 to its inverted position, the earth is dumped into the furrow. If it is desired to dump the scoop while partially loaded, or in the event of failure of the arm 4 to release the same, the bracket 24 may be swung to move the roller 5 to an ineffective position. For this purpose the bracket 24 is provided with a lever arm 30 to which a cable 31 is connected for swinging said bracket 24 on its pivot 25 and disengaging the roller 5 from the end 20 of the lever 4. As before stated, the shoe 2 is eccentrically mounted. In this connection, the eccentric mounting is such that when the shoe is rotated from its normal position, the throw of the same is downward about the spindles 12. This is for the purpose of obtaining the proper leverage against the weight of the scoop to facilitate lifting the same off the ground.

Figure 4:
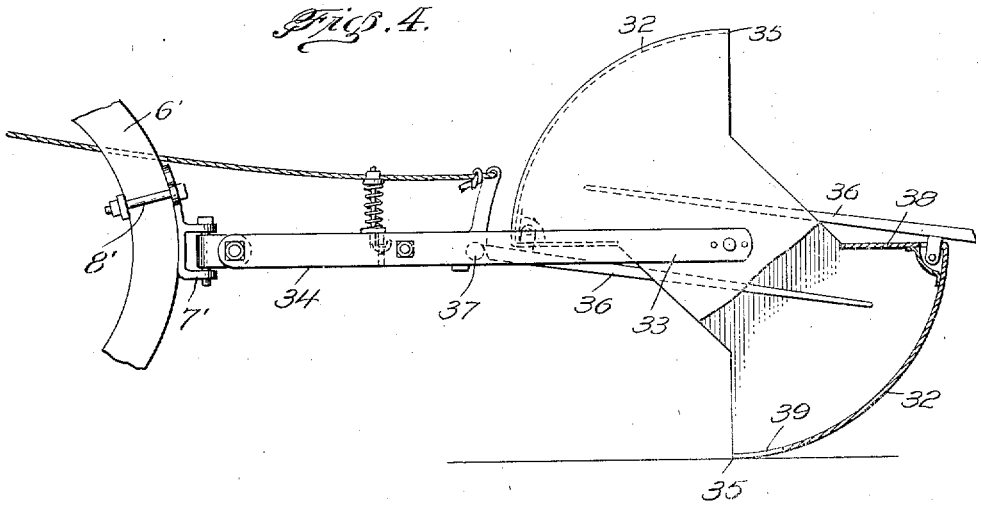
Figure 4 is a view partly in side elevation and partly in section of one modification of the invention.
Figure 5:
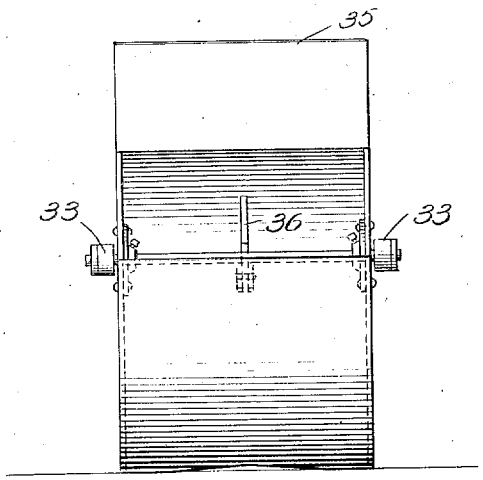
Figure 5 is a view in rear elevation of said modification.

In the modified form of the invention shown in Figures 4 and 5, the shoe feature is eliminated and a pair of segmental integral scoops 32 are mounted in diametrically opposed relation between the yoke arms 33 for rotation concentrically on the frame 1. In the normal position of the scoops 32 one or the other thereof drags on the ground with its front edge 35 foremost, the other being in a forward elevated position. A pair of escapement arms 36 are mounted on the scoops 32, respectively, for co-operation with a roller 37 to hold one or the other of said scoops, whichever the case may be, in normal ground engaging position. The operation of the escapement arms 36 and their co-operation with the roller 37 is substantially the same as described with reference to the escapement arm 4. In the operation of this form of the invention, when the one scoop 32 has accumulated a maximum load, its escapement arm 36 is released from the roller 37 just as described with reference to the escapement arm 4. The other scoop 32 is then rotated to engage its leading edge with the ground by the drag of the first scoop, as will be understood. Under the forward travel of the scoops the second scoop is then forced into the ground to continue rotation of the scoops by a peripheral engagement therewith. In this connection it is to be noted that the escapement arms 36 are mounted on their related scoops so as to form leading ground engaging members adapted to dig into the ground and facilitate rotation of the scoop. Each scoop 32, in this instance, is provided with a rear wall 38 to prevent earth from rolling into the rear edge of the scoop as it comes down onto the surface of the ground. The front edge 35 of each scoop 33 is formed with a V-shaped notch 39 located centrally thereof and breaking the continuity of said front edge. The purpose of these notches is to prevent the scoop 32 from picking up seed, as for instance when the lister to which they are attached is being used in planting.

The foregoing detailed explanation will, it is believed, suffice to impart a clear understanding of my invention. The details described are, however, to be understood as illustrative rather than restrictive, and right is herein reserved to modifications thereof falling within the scope of the claims appended hereto.

What I claim is:

1. In an implement of the class described, a frame, a segmental scoop having a front edge and revolubly mounted in said frame for rolling contact with the ground and to present said edge to the ground in scraping position to thereby accumulate a load in said scoop, and means to lock said scoop in said position, said means including means projecting interiorly of the scoop for engagement with the material therein to thereby release said locking means.

2. In an implement of the class described, a frame, a segmental scoop having a front edge and revolubly mounted in said frame for rolling contact with the ground and to present said edge to the ground in scraping position to thereby accumulate a load in said scoop, and escapement devices for locking said scoop in said position and comprising, an abutment member on said frame, and a pivoted escapement arm on said scoop revolved by the latter into engagement with said abutment and movable about its pivot to disengaging position by the accumulation of a load in said scoop.

3. In an implement of the class described, a frame, a segmental scoop having a front edge and revolubly mounted in said frame for rolling contact with the ground and to present said edge to the ground in scraping position to thereby accumulate a load in said scoop, and escapement devices for locking said scoop in said position and comprising, a roller on said frame, a pivoted escapement arm on said scoop revolved by said shoe into engagement with said roller and movable about its pivot to disengaging position by the accumulation of a load in said scoop, said roller being mounted on the frame for movement into and out of effective positions, and manipulative means for moving said roller.

4. In an implement of the class described, a frame, a segmental shoe rotatably mounted therein for rolling contact with the ground, a scoop secured in said shoe at one end thereof and having a front edge parallel with the axis of rotation of said shoe, and means to lock said shoe against rotation with said edge of the scoop in ground engaging position to accumulate a load in said scoop and comprising, co-engaging escapement devices disengaged by the accumulation of a load in said scoop.

5. In an implement of the class described, a frame, a segmental shoe rotatably mounted therein for rolling contact with the ground, a scoop secured in said shoe at one end thereof and having a front edge parallel with the axis of rotation of said shoe, means to lock said shoe against rotation with said edge of the scoop in ground engaging position to accumulate a load in said scoop and comprising, co-engaging escapement devices disengaged by the accumulation of a load in said scoop, and manipulative means for disengaging said devices at will.

6. In an implement of the class described, a frame, a segmental shoe rotatably mounted therein for rolling contact with the ground, a scoop secured in said shoe at one end thereof and having a front edge parallel with the axis of rotation of said shoe, and escapement mechanism to lock said shoe against rotation with said edge of the scoop in ground scraping position to accumulate a load in said scoop, said mechanism comprising, a pivoted escapement arm on said shoe movable to an escapement disabling position by the accumulation of a load in said scoop.

7. In an implement of the class described, a frame, a segmental shoe rotatably mounted therein for rolling contact with the ground, a scoop secured in said shoe at one end thereof and having a front edge parallel with the axis of rotation of said shoe, and means to lock said shoe against rotation with said edge of the scoop in ground engaging position to accumulate a load in said scoop and comprising, a roller on said frame, a pivoted escapement arm on said shoe revolved by the latter into engagement with said roller and movable on its pivot to disengaged position by the accumulation of a load in said scoop.

8. In an implement of the class described, a frame, a segmental shoe rotatably mounted therein for rolling contact with the ground, a scoop secured in said shoe at one end thereof and having a front edge parallel with the axis of rotation of said shoe, and escapement mechanism to lock said shoe against rotation with said edge of the scoop in ground scraping position to accumulate a load in said scoop, said mechanism comprising, an abutment member on said frame, and a pivoted escapement arm on said shoe having a plate at one end thereof and revolved by the shoe to engage the abutment and to position said plate in overlying relation to a load being accumulated in said scoop, whereby said arm is disengaged by the accumulation of said load.

9. In an implement of the class described, a frame, a segmental shoe rotatably mounted therein for rolling contact with the ground, a scoop secured in said shoe at one end thereof and having a front edge parallel with the axis of rotation of said shoe, escapement mechanism to lock said shoe against rotation with said edge of the scoop in ground scraping position to accumulate a load in said scoop, said mechanism comprising, an abutment member on said frame, a pivoted escapement arm on said shoe having a plate at one end thereof and revolved by the shoe to engage the abutment and to position said plate in overlying relation to a load being accumulated in said scoop, whereby said arm is disengaged by the accumulation of said load, said abutment being movable to ineffective position relative to said arm, and manipulative means for moving said abutment.

10. In an implement of the class described, a travelling frame, a segmental ground engaging shoe rotatably mounted in said frame, a scoop mounted in said shoe at one end thereof and having a front edge parallel with the axis of rotation of said shoe and projecting beyond said end thereof, and releasable scoop holding means having a portion thereof projecting interiorly of the scoop when in holding position for engagement with the material accumulated by said scoop to thereby automatically release said scoop when a predetermined quantity of material has accumulated in said scoop, said shoe being so constructed as to lift said scoop when said holding means is in released position and said scoop is discharging said material.

11. A damming device comprising in combination, a draft member, an earth-engaging tool mounted on said member in a normally earth-engaging position and rotatable relative thereto out of said earth-engaging position, detent means for preventing rotation of said tool as the latter is moved in earth-engaging position, means responsive to the height of the pile of earth accumulated in front of said tool, for disabling said detent means thereby allowing said tool to rotate, whereby said pile of accumulated earth is deposited, means connected with said tool for restoring it to earth-engaging position.

12. A damming device comprising in combination a draft member, an assembly of earth-collecting blades rotatably mounted on said member, detent means for preventing rotation of said assembly as the latter is moved with one of said blades in earth-engaging relation, and means responsive to the height of the earth collected, for disabling said detent means thereby allowing said assembly to rotate whereby the collected earth is deposited as a dam, the rotation of said assembly being arrested when the latter has rotated to a position in which another of said blades is in earth-engaging relation.

13. A damming device adapted to be propelled in a furrow to accumulate loose earth for making dams in the furrow, comprising a scraping tool movable into and out of earth engaging relation, said tool having a blunt end and a recess in said end to avoid disturbing the seed bed in the bottom of said furrow, draft means for said tool, and means for controlling the movement of said tool out of operative position in said furrow to deposit said accumulated earth.

14. In combination, a scraping tool adapted to be propelled in an earth-engaging position for accumulating a pile of earth in front of the tool, said tool being movable out of earth-engaging position by the reaction of said accumulated earth against the tool as the latter moves forwardly, means for holding said tool in earth-engaging position during the accumulation of said pile, means responsive to the height of said pile, for disabling said holding means, and means effective upon the said tool being moved out of earth-engaging position for restoring said tool to earth-engaging position.

15. In combination, a scraping tool adapted to be propelled in an earth-engaging position for accumulating a pile of earth in front of the tool, said tool being movable out of earth-engaging position to deposit said pile, supporting means for said tool, a gauge arm disposed in front of said tool and pivotally mounted thereon for gauging the height of the pile, and means actuated by the pivotal movement of said arm, for controlling the movement of said tool out of earth-engaging position.

16. A damming device comprising in combination a draft member, a tool carrying member supported on said draft member for rotation about a transverse axis, at least one earth collecting tool mounted on said carrying member, releasable detent means for preventing rotation of said tool-carrying member as the latter is moved forwardly with said tool in earth-engaging relation, and a gauging arm pivotally mounted on one of said members to rotate with the tool-carrying member, and connected to said detent means, whereby the earth collected by said earth-engaging tool accumulates under said arm and forces the latter to pivot, thereby disabling said detent means.

17. A damming device comprising in combination a draft member, a tool-carrying member supported on said draft member for rotation about a transverse axis, at least one earth collecting tool mounted on said carrying member, releasable detent means for preventing rotation of said tool-carrying member as the latter is moved forwardly with said tool in earth-engaging relation, and a gauging arm pivotally mounted on said tool carrying member and connected to said detent means, whereby the earth collected by said earth-engaging tool accumulates under said arm and forces the latter to pivot, thereby disabling said detent means.

18. An independent unitary damming device for attachment to the shank of an earth-engaging tool for operation in trailing position behind the latter, comprising a rotatable scraper assembly including at least one earth-engaging blade, a draft member connected thereto, and means for pivotally connecting said draft member to said tool shank for lateral swinging movement relative thereto.

19. An independent unitary damming device for attachment to the shank of an earth-engaging tool for operation in trailing position behind the latter, comprising a rotatable assembly of earth-engaging blades, a draft member connected thereto, and means for pivotally connecting said draft member to said tool shank for lateral and vertical swinging movement relative thereto.

20. An independent unitary damming device for attachment to the shank of a furrow-forming tool for operation in the furrow formed thereby, comprising a rotatable scraper assembly including at least one earth-engaging blade, draft means therefor, and means for pivotally connecting said draft means to said tool shank for vertical and lateral swinging movement relative thereto.

21. A damming device for operation in trailing position behind an agricultural implement, comprising in combination, a draft member, means for pivotally connecting said draft member to said implement providing for both lateral and vertical swinging movement relative thereto, an earth-engaging blade mounted on said draft member and movable relative to said draft member between operative and inoperative positions as the device is moved forwardly, and means actuated by the earth moved by said blade for controlling a movement of the blade.

22. An independent unitary damming device for attachment to a furrow forming tool for operation in trailing position in the furrow formed thereby, comprising a draft member, means for pivotally connecting said member to said tool for lateral swinging movement relative thereto, and a rotatable scraper assembly connected to said draft member, said assembly including at least one earth-engaging blade adapted to collect earth from the furrow walls to form dams, said blade having a notch in the end thereof for the purpose of avoiding disturbance of the seed bed in the bottom of the furrow.

23. A device of the class described, comprising in combination, an earth engaging scraper blade disposed transversely of the line of advance of said device and adapted to be drawn in a previously formed lister furrow for accumulating loose soil from the sides thereof and movable between earth-engaging and inoperative positions for the purpose of dumping the accumulated earth to form a dam in said furrow, said blade having a cut-away portion in the lower end thereof for the purpose of avoiding disturbance of the seed bed in the bottom of the furrow.

24. In a damming device, a dam forming tool movable into and out of earth engaging position, mechanical means responsive to a predetermined height of accumulated earth in front of said tool for controlling the movement of the tool out of earth-engaging position, and manually operated means for optionally controlling said movement.

25. A damming device comprising a draft member, a scraping tool mounted thereon and rotatable relative thereto about a transversely disposed axis, means for locking said tool to said draft member in a position for collecting earth as the implement is drawn forwardly, and a control member pivotally connected to said tool and disposed to lie on the pile of collected earth for unlocking said tool from said draft member when said pile of earth builds up to a predetermined limit, whereby said tool rotates about said axis and deposits said collected earth.

26. A device of the class described, comprising a draft member, a scraping tool mounted thereon and rotatable relative thereto about a transversely disposed axis, a pair of interengaging locking members on said tool and said draft member, respectively, for locking the same together in a position for collecting earth as the implement is drawn forwardly, each of said locking members being movably mounted on its respective support whereby it is releasable from the other of said members, one of said locking members being resiliently held in locked position, and means for moving the other of said members to unlock said tool from said draft member.

27. A device of the class described, comprising a draft member, a scraping tool mounted thereon and rotatable relative thereto about a transversely disposed axis, a pair of interengaging locking members on said tool and said draft member, respectively, for locking the same together in a position for collecting earth as the implement is drawn forwardly, one of said locking members being movably mounted on said draft member and having means for manually disengaging it from the other locking member, the other of said locking members being movably mounted on said rotatable tool, and means for automatically moving the last named locking member to unlock said tool from said draft member.

28. A device of the class described, comprising a draft member, a scraping tool mounted thereon and rotatable relative thereto about a transversely disposed axis, a pair of interengaging locking members on said tool and said draft member, respectively, for locking the same together in a position for collecting earth as the implement is drawn forwardly, one of said locking members being mounted on said draft member and movable relative thereto to disengaged position, and means for yieldably holding said locking member in locked position, the other of said locking members being movably mounted on said rotatable tool and movable relative thereto to disengaged position, and control means swingably mounted on said tool for gauging the amount of collected earth in front of the tool and connected with the last named locking member for disengaging the latter when the amount of earth collected reaches a predetermined amount.

29. In a damming device, an earth-engaging tool adapted to operate in a furrow behind a furrow-forming implement to thereby accumulate soil in the form of a dam across the furrow, the said tool being normally supported in a depending position in the furrow and being movable rearwardly and upwardly for depositing the accumulated soil, mechanism normally bracing the tool against said rearward and upward movement, means including a member pivotally supported at its forward end and disposed in a position to be actuated by the height of the soil accumulated in the furrow for disabling the bracing mechanism, and means connected with said tool for restoring it to soil-accumulating position after each accumulation of soil has been deposited.

30. In combination with a lister plow a frame supported from the plow, a scraper pivotally supported on the frame and normally locked in one position in the frame, means operable by the accumulation of soil by the scraper to release the said scraper, and means, effective by the forward travel of the plow to lift the scraper upon being released, and for restoring the scraper to initial position.

31. In combination with a tillage implement for forming a furrow, a frame supported from the implement, a scraper pivotally supported in the frame to be carried thereby in the furrow, means effective to normally lock the scraper in operative position with respect to the furrow but releasable by the accumulation of soil scraped up in the furrow ahead of the scraper, and means for supporting the scraper as it is released and restoring it to locked position.

32. In combination with a tillage implement for forming a furrow, a frame supported from the implement, a scraper pivotally supported in the frame to be carried thereby along the furrow transversely extended therein, means normally effective to lock the scraper in scraping position in the furrow but releasable by the accumulation of scrapings in the furrow to a predetermined height ahead of the scraper to thereby free the scraper, and a means connected with the scraper to restore the scraper to locked position.

33. In combination with a lister plow a frame supported from the plow, a scraper pivotally supported on the frame and normally locked in one position in the frame, means operable by the accumulation of soil by the scraper to release the said scraper, and means effective by the forward travel of the plow to turn the scraper through one revolution upon being released and for restoring the scraper to initial position.

34. In combination with an implement including a furrow forming element, a frame supported from the implement, a single scraper pivotally mounted in the frame to be carried thereby in the furrow formed by the implement, means normally effective to lock the scraper in operative position but releasable by action of the accumulation of soil in the furrow ahead of the scraper to release the scraper, turn it through one complete revolution about its axis and restore it to locked position.

35. In combination with a tillage implement for forming a furrow, a frame supported from the implement, a scraper pivotally supported in the frame to be carried thereby in the furrow, means effective to normally lock the scraper in operative position with respect to the furrow but releasable by the accumulation of soil scraped up in the furrow ahead of the scraper, and means for supporting the scraper as it is released and carrying it through one complete revolution about its axis and restoring it to locked position.

36. In combination with a tillage implement for forming a furrow, a frame supported from the implement, a scraper pivotally supported in the frame to be carried thereby along the furrow transversely extended therein, means normally effective to lock the scraper in scraping position in the furrow but releasable by the accumulation of scrapings in the furrow to a predetermined height ahead of the scraper to thereby free the scraper, and a means connected with the scraper and adapted to rotate therewith through one complete revolution about the pivotal axis of the scraper to restore the scraper to locked position.

37. A dammer including a tool, means for supporting said tool for movement into and out of operating position, means for normally holding said tool in operative position but releasable by the accumulation of scrapings in the furrow to a predetermined height ahead of the scraper to thereby free the scraper, and a means connected with the scraper to restore the scraper to locked position.

38. A dammer comprising a frame, a scraper rotatably mounted in said frame to be propelled thereby, means normally effective to lock the scraper in scraping position, including gauge means responsive to the accumulation of scrapings to a predetermined height ahead of the scraper to release the scraper, means effective when said scraper is released for rotating it through one complete rotation to scraping position as the dammer is drawn forwardly, and a support on said scraper extending forwardly to a point ahead of said scraper, said gauge means being mounted on the forward end of said support to rotate with said scraper and extending rearwardly toward the latter and being effective to relock said scraper when it again reaches its scraping position.

39. A dammer comprising a frame, a scraper rotatably mounted in said frame to be propelled thereby, means normally effective to lock the scraper in scraping position, including gauge means responsive to the accumulation of scrapings to a predetermined height ahead of the scraper to release the scraper, and means effective when said scraper is released for rotating it through one complete rotation to scraping position as the dammer is drawn forwardly, said gauge means being mounted to rotate with said scraper and being effective to relock said scraper when it again reaches its scraping position.

40. A dammer comprising a frame, a plurality of scrapers angularly spaced and rotatably mounted in said frame to be propelled thereby, means normally effective to lock said scrapers successively in scraping position, including a gauge means for each scraper responsive to the accumulation of scrapings to a predetermined height ahead of its scraper to release the same, and means effective when one scraper is released for rotating it to dispose another scraper in scraping position as the dammer is drawn forwardly, said gauge means being mounted to rotate with said scrapers and disposed to successively relock said scrapers in scraping position as they are rotated into scraping position.

41. A damming device comprising a draft member, a scraper tool mounted thereon by means providing for movement relative thereto between operative and inoperative positions, means for locking said tool to said draft member in operative position for collecting earth as the device is drawn forwardly, means responsive to the height of the collected earth for unlocking said tool from said draft member to permit movement into said inoperative position, and means connected with said tool and effective after said tool has reached said inoperative position for restoring it to said operative position.

ELMER W. FICKEN.